US011310263B1

(12) United States Patent
Block et al.

(10) Patent No.: US 11,310,263 B1
(45) Date of Patent: *Apr. 19, 2022

(54) ROGUE FOOTHOLD NETWORK DEFENSE

(71) Applicant: Wells Fargo Bank, N.A., San Francisco, CA (US)

(72) Inventors: Matthew J. Block, Winston Salem, NC (US); Jon M. Welborn, Amherst, NC (US); Adam Sheesley, Mocksville, NC (US); David Huehulani Keene, Bessemer City, NC (US); Jennifer A. Holton, Clemmons, NC (US); Douglas S. Rodgers, Mooresville, NC (US)

(73) Assignee: WELLS FARGO BANK, N.A., San Francisco, CA (US)

( * ) Notice: Subject to any disclaimer, the term of this patent is extended or adjusted under 35 U.S.C. 154(b) by 56 days.

This patent is subject to a terminal disclaimer.

(21) Appl. No.: 16/855,649

(22) Filed: Apr. 22, 2020

Related U.S. Application Data

(63) Continuation of application No. 15/495,317, filed on Apr. 24, 2017, now Pat. No. 10,666,679.

(51) Int. Cl.
| | | |
|---|---|---|
| *H04L 29/06* | (2006.01) | |
| *H04L 41/16* | (2022.01) | |
| *H04L 41/0816* | (2022.01) | |
| *H04L 41/0681* | (2022.01) | |

(52) U.S. Cl.
CPC ...... *H04L 63/1441* (2013.01); *H04L 41/0681* (2013.01); *H04L 41/0816* (2013.01); *H04L 41/16* (2013.01); *H04L 63/1425* (2013.01)

(58) Field of Classification Search
CPC ............ H04L 63/1441; H04L 63/1425; H04L 41/0816; H04L 41/0681; H04L 41/16
See application file for complete search history.

(56) References Cited

U.S. PATENT DOCUMENTS

| | | |
|---|---|---|
| 7,469,279 B1 | 12/2008 | Stamler et al. |
| 7,925,729 B2 | 4/2011 | Bush et al. |
| 8,667,096 B2 | 3/2014 | Dehaan et al. |
| 9,083,605 B2 | 7/2015 | Banavalikar et al. |
| 9,251,115 B2 | 2/2016 | Bursell |
| 9,325,726 B2 | 4/2016 | Lietz et al. |

(Continued)

OTHER PUBLICATIONS

Trivedi, Toward Autonomic Security for industrial Control Systems, Department of Electrical and Computer Engineering, Aug. 2015, 1 page.

*Primary Examiner* — Nelson S. Giddins
(74) *Attorney, Agent, or Firm* — Kilpatrick Townsend & Stockton LLP

(57) ABSTRACT

The innovation disclosed and claimed herein, in one aspect thereof, comprises systems and methods of reconfiguring network settings. The systems and methods monitor a network and detect a hacker on a network. The systems and methods can reconfigure network settings of the network upon detecting the hacker. The systems and methods can analyze the hack for severity; and determine a reconfiguration layer based on the severity of the hack. The reconfiguration layer determines a subset of the network settings to be reconfigured. The systems and methods can dismantle the network and generate a replacement network having the reconfigured set of network settings and replace the network with the replacement network.

20 Claims, 6 Drawing Sheets

(56) References Cited

U.S. PATENT DOCUMENTS

| | | |
|---|---|---|
| 2006/0212932 A1 | 9/2006 | Patrick et al. |
| 2012/0023572 A1* | 1/2012 | Williams, Jr. ...... H04L 63/1425 |
| | | 726/13 |
| 2014/0180738 A1 | 6/2014 | Phillipps et al. |
| 2015/0036539 A1* | 2/2015 | Townend .............. H04W 48/12 |
| | | 370/254 |
| 2015/0089655 A1 | 3/2015 | Choi et al. |
| 2015/0128205 A1 | 5/2015 | Mahaffey et al. |
| 2015/0188949 A1* | 7/2015 | Mahaffey .............. H04W 12/37 |
| | | 726/1 |
| 2017/0063920 A1 | 3/2017 | Thomas et al. |
| 2017/0214709 A1 | 7/2017 | Maestas |
| 2017/0331847 A1 | 11/2017 | Alexander et al. |
| 2017/0353491 A1 | 12/2017 | Gukal et al. |
| 2018/0034920 A1 | 2/2018 | Gopalan et al. |
| 2018/0234454 A1 | 8/2018 | Aggarwal et al. |

\* cited by examiner

ROGUE FOOTHOLD NETWORK DEFENSE

CROSS REFERENCE TO RELATED APPLICATIONS

This application is a continuation of co-pending U.S. application Ser. No. 15/495,317, filed on Apr. 24, 2017, entitled "ROGUE FOOTHOLD NETWORK DEFENSE." The entirety of the above-noted application is incorporated by reference herein.

BACKGROUND

Hacking and malware can incapacitate a network supplying critical functionality to a business and/or customers. When hacking is discovered on a network, it can be difficult to secure the network and remove the hacker from the network. Once a hacker has gained access to a network, the hacker learns information about the network settings of the network. This learned information aids the hacker in subsequent attempts to access the network. Conventional tactics are to reconfigure a network. However, reconfiguring a network can be time consuming and is usually done manually on an iterative implementation. This mode of reconfiguring allows the hacker too much time to learn the reconfigured network settings during the process. Further, the reconfiguring can lead to decreased functionality of the network while being implemented.

BRIEF SUMMARY OF THE DESCRIPTION

The following presents a simplified summary of the innovation in order to provide a basic understanding of some aspects of the innovation. This summary is not an extensive overview of the innovation. It is not intended to identify key/critical elements of the innovation or to delineate the scope of the innovation. Its sole purpose is to present some concepts of the innovation in a simplified form as a prelude to the more detailed description that is presented later.

The innovation disclosed and claimed herein, in one aspect thereof, comprises systems and methods of reconfiguring networks. The systems and methods monitor a network having a plurality of network segments. The systems and methods detect a foothold event at a first network segment, wherein the first network segment includes a set of network settings. The systems and methods can reconfigure the set of network settings of the first network segment upon detecting the foothold event. The systems and methods can analyze the foothold event for severity; and determine a reconfiguration layer based on the severity of the foothold event, wherein the reconfiguration layer determines a subset of network settings of the set of network settings to be reconfigured.

The systems and methods can dismantle the first network segment such that the first network segment becomes offline or no longer part of the network. The systems and methods can generate a second network segment having the reconfigured set of network settings and replace the first network segment with the second network segment.

In aspects, the subject innovation provides substantial benefits in terms of network security. One advantage resides in increasing the difficulty to maintain a hack of a network. Another advantage resides in automatically reconfiguring network settings while maintaining communication paths between networked nodes.

To the accomplishment of the foregoing and related ends, certain illustrative aspects of the innovation are described herein in connection with the following description and the annexed drawings. These aspects are indicative, however, of but a few of the various ways in which the principles of the innovation can be employed and the subject innovation is intended to include all such aspects and their equivalents. Other advantages and novel features of the innovation will become apparent from the following detailed description of the innovation when considered in conjunction with the drawings.

BRIEF DESCRIPTION OF THE DRAWINGS

Aspects of the disclosure are understood from the following detailed description when read with the accompanying drawings. It will be appreciated that elements, structures, etc. of the drawings are not necessarily drawn to scale. Accordingly, the dimensions of the same may be arbitrarily increased or reduced for clarity of discussion, for example.

DETAILED DESCRIPTION

Figure 1:
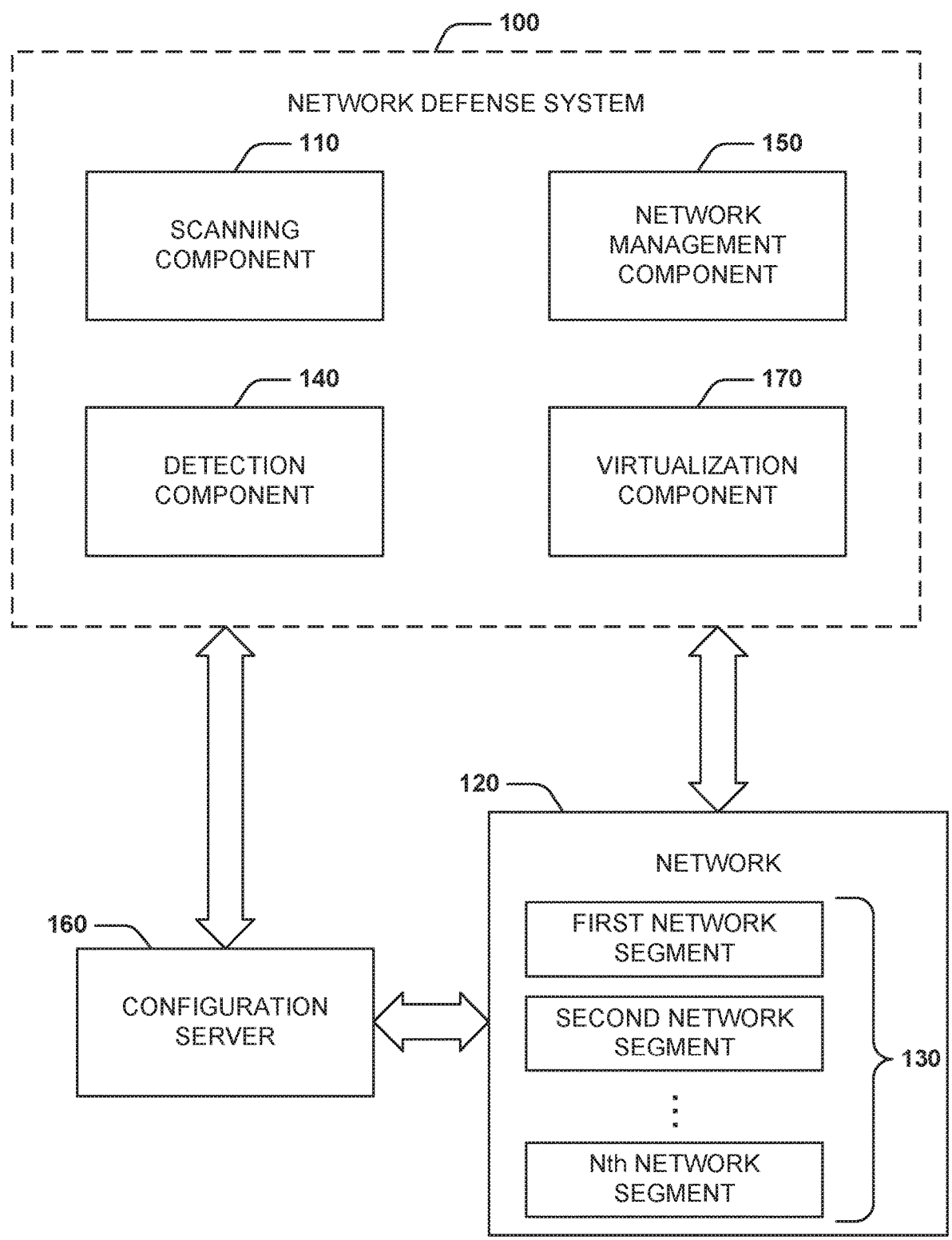
FIG. 1 illustrates an example component diagram of a network defense system.

The innovation is now described with reference to the drawings, wherein like reference numerals are used to refer to like elements throughout. In the following description, for purposes of explanation, numerous specific details are set forth in order to provide a thorough understanding of the subject innovation. It may be evident, however, that the innovation can be practiced without these specific details. In other instances, well-known structures and devices are shown in block diagram form in order to facilitate describing the innovation.

As used in this application, the terms "component", "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, or a computer. By way of illustration, both an application running on a controller and the controller can be a component. One or more components residing within a process or thread of execution and a component may be localized on one computer or distributed between two or more computers.

Furthermore, the claimed subject matter can be implemented as a method, apparatus, or article of manufacture using standard programming or engineering techniques to produce software, firmware, hardware, or any combination thereof to control a computer to implement the disclosed subject matter. The term "article of manufacture" as used herein is intended to encompass a computer program accessible from any computer-readable device, carrier, or media.

Of course, many modifications may be made to this configuration without departing from the scope or spirit of the claimed subject matter.

FIG. 1 illustrates a network defense system 100 for protecting network security and/or information. For example, the network defense system 100 prevents malware or foothold attacks by outside hackers that have obtained illegal and/or unauthorized access to a private network. The system 100 includes a scanning component 110. The scanning component 110 monitors a network 120. In some embodiments, the scanning component 110 continuously or intermittently scans the network 120.

The network 120 can be a mobile network, wired LAN, wireless LAN, an internet network, or the like to transmit communications. The network 120 can be a corporation wide network that provides online services and/or access to corporate sites and/or information. In some embodiments, the network 120 is made up of network segments 130. For example, the network 120 may include a set of network segments 130 that range from a first network segment, a second network segment, to an Nth network segment. The network segments 130 can divide the network 120 into a series of smaller networks (e.g. sub-networks, virtual networks, ad hoc networks, and/or the like) that can provide access to different services, devices, and/or functionality. The network 120 can control access to different network segments 130 such that only part of the network may be available to certain users, devices, and/or applications.

The network defense system 100 includes a detection component 140. The detection component 140 detects anomalies or attacks on the network based on information received from the scanning component 110. In some embodiments, the detection component 140 can detect unauthorized access to a network segment 130 or segments by outside entities, (e.g. hackers). Unauthorized access can be categorized as a foothold event where the entity having gained unauthorized access is performing mining functions to steal sensitive data, download malware to the network segment 130, and/or other malicious activities. Upon detection of a foothold event by an outside entity, defense actions are triggered by the network defense system 100 to void the access obtained by the outside entity and/or reconfigure the compromised network segment 130.

The network defense system 100 includes a network management component 150. The network management component 150 can reconfigure (or reconstruct or create) settings of the network 120 or the network segment(s) 130. In some embodiments, the network management component 150 can generate a new (second) network segment having the reconfigured settings. The network management component 150 can replace a network segment where a foothold event has been detected with the generated second network segment.

In some embodiments, the network management component 150 can analyze the detected foothold event for severity based on factors. For example, the network management component 150 can factor criticality of the network segment, overall threat of the foothold event to compromising network data, extent of the foothold, and/or the like. In some embodiments, a severity score may be calculated based on the factors. The severity score may be a weighted average of the factors with some factors having more weight than others. Based on the analysis, the network management component 150 can determine a layer of reconfiguration of the network settings. The severity score can be compared to a threshold score or score tiers to determine a reconfiguration layer. For example, a low severity score may lead to a determination of a less number of settings to reconfigure in contrast to a high severity score. Likewise, a high severity score determines a high number (or all) of settings to reconfigure.

In some embodiments, the network management component 150 may implement settings changes or create new network segments using a configuration server 160. The configuration server 160 provides initial settings for the network 120 or network segments 130. The configuration server 160 deploy the settings from a remote or local location with respect to the network 120. The configuration server 160 can receive new settings from the network management component 150. In some embodiments, the configuration server 160 deploys the new settings to a network segment. In other embodiments, the configuration server 160 deploys the new settings as an initalized set of settings for a newly created network segment.

In some embodiments, a reconfiguration of the set of settings may not be triggered by a foothold event. Rather, the reconfiguration is a scheduled process as part of a greater network security or maintenance plan. For example, a network administrator may schedule monthly reconfigurations to be performed automatically by the network management component. The routine maintenance may be a failsafe against undetected hackers missed by the detection component 140.

The network defense system 100 can include a virtualization component 170. The virtualization component 170 can create, delete, manage, edit, and/or the like network segments 130 in a virtual environment that belong to the network 120. In some embodiments, the virtualized network segments are implemented and controlled using virtualization software such as VMWARE and/or the like.

Figure 2:
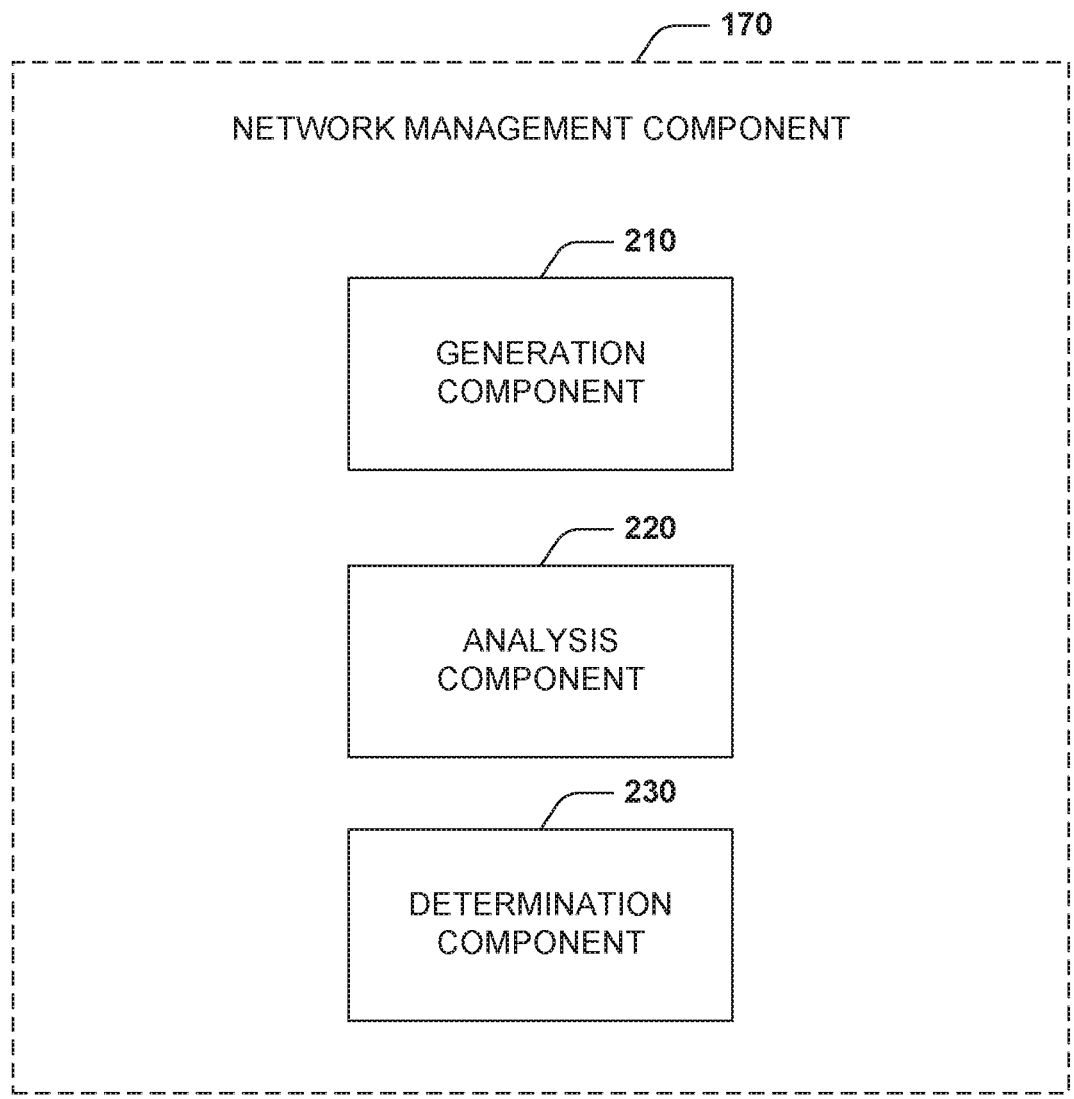
FIG. 2 illustrates an example component diagram of a network management component.

FIG. 2 illustrates a detailed component diagram of the network management component 150. The network management component 150 includes a generation component 210. The generation component 210 reconfigures settings of the network 120 or network segment(s) 130. In some embodiments, the generation component 210 can generate a second network segment having the reconfigured settings. The generation component 210 can replace a network segment where a foothold event has been detected with the generated second network segment.

In some embodiments, the generation component 210 reconfigures some but not all settings of a network segment. The generation component 210 can receive an indication of which settings to reconfigure. The network management component 150 receives information from the detection component 140 and/or the scanning component 110. For example, information about a detected presence of a hacker on a network segment can be sent to the network management component 150.

The network management component 150 includes an analysis component 220. The analysis component 220 analyzes the received information. In some embodiments, the analysis component 220 determines a severity score based on determining factors. For example, the analysis component 220 can account for criticality of the network segment (e.g. overall importance of the network segment to the network 120 as a whole). For example, a network segment that provides access to customer account data may be more critical than a network segment that provides an informational intranet to employees. Other factors may include type of the foothold event to (e.g. malware attack, hacker attack, and/or the like), and/or extent of the foothold (e.g. duration of foothold, information compromised, information learned by a hacker) and/or the like.

Based on the analysis by the analysis component 220, a determination component 230 can determine a layer (e.g. level) of reconfiguration of the network settings. For example, the determination component 230 determines a Layer 1 reconfiguration of the settings for a compromised network segment. The Layer 1 reconfiguration translates to reconfiguration of IP addresses of network devices. In contrast, if the determination component 230 determines a Layer 2 reconfiguration of the settings, IP addresses, MAC addresses, SNMP settings, DNS settings are reconfigured for the network segment and devices connected to the network segment. In some embodiments, the determination component 230 and/or the network management component 150 can implement the reconfiguration to the network 120. In other embodiments, the determination component 230 and/or the network management component 150 can forward the reconfiguration to the configuration server 160 to be implemented to the network 120.

Figure 3:
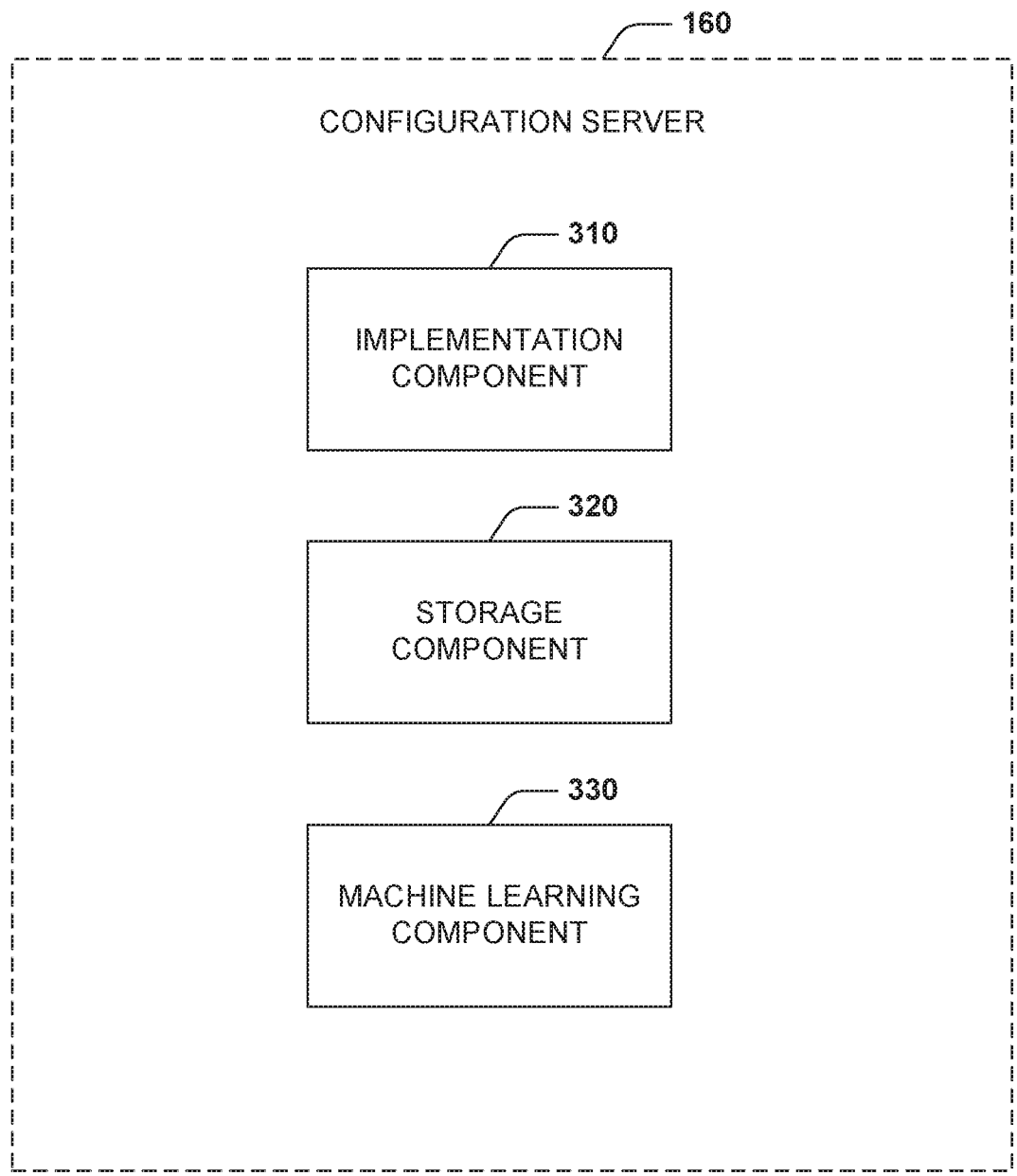
FIG. 3 illustrates an example component diagram of a configuration server.

FIG. 3 illustrates a component diagram of a configuration server 160. The configuration server 160 includes an implementation component 310. The implementation component 310 deploys settings changes or creates new network segments to the network 120. The implementation component 310 provides initial settings for the network 120 or network segments 130. The initial settings are stored by a storage component 320. The implementation component 310 deploys the settings from a remote or local location with respect to the network 120. The implementation component 310 can receive new settings from the network management component 150. In some embodiments, the implementation component 310 deploys the new settings to a network segment. In other embodiments, the implementation component 310 deploys the new settings as an initialized set of settings for a newly created network segment.

In some embodiments, the storage component 320 stores communication paths between networked nodes (e.g. networked devices) connected via network segments 130. The storage component 320 can store node communication information that includes information about the nodes connected to the compromised first network segment and the original and reconfigured settings to be deployed to each node. The storage component 320 can provide the communication paths and node communication information to the network management component 150. The network management component 150 can rebuild the communication paths between at least two nodes connected to the new network segment using the node communication information.

The configuration server 160 includes a machine learning component 330. The machine learning component 330 can learn network settings across the network 120 and network segments 130. The machine learning component 330 can customize the set of network settings according to machine learned settings on the configuration server 160. The machine learning component 330 utilizes the machine learned information to facilitate rebuilding or reconfiguring a network segment 130. For example, machine learned concepts can facilitate determining a reconfiguration layer and/or a reconfiguration of the settings which can increase response time to a detected foothold event.

Figure 4:
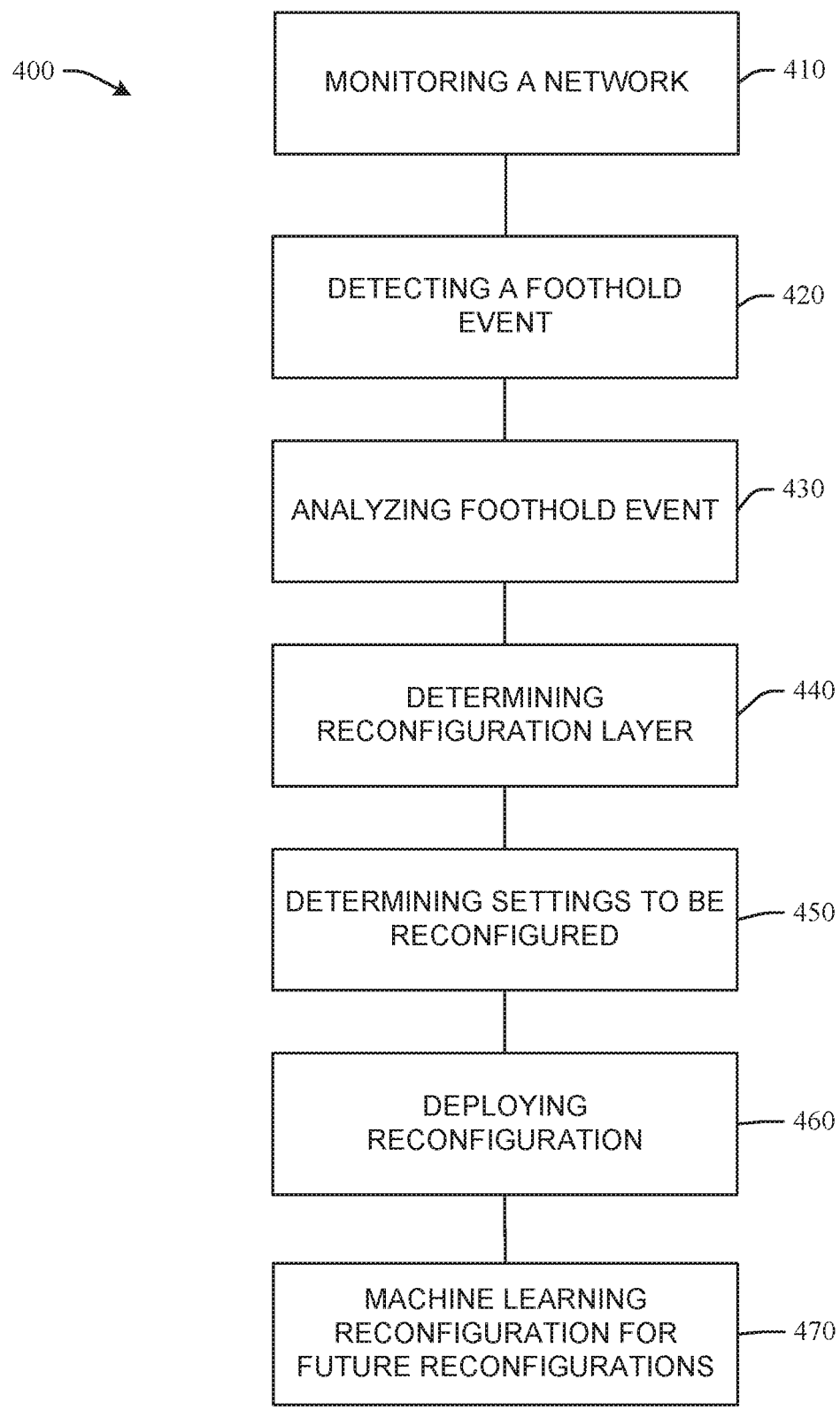
FIG. 4 illustrates a method for reconfiguring networks.

With reference to FIG. 4, example methods 400 are depicted for reconfiguring networks. While, for purposes of simplicity of explanation, the one or more methodologies shown herein, e.g., in the form of a flow chart, are shown and described as a series of acts, it is to be understood and appreciated that the subject innovation is not limited by the order of acts, as some acts may, in accordance with the innovation, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation. It is also appreciated that the method 400 are described in conjunction with a specific example is for explanation purposes.

FIG. 4 illustrates a method 400 for reconfiguring compromised networks or network segments. At 410, a network is monitored for unauthorized access by potential malicious entities. For example, a network is used by a business to provide access to customer accounts. The network is monitored for potential hacking or network based attacks such as a denial of service attack. In some embodiments, the network is divided into network segments that provide different services or connections. The network segments include a set of network settings. At 420, a foothold event is detected at a first network segment. In the example, a hacker is detected on the network where the network data and/or functionality may be or become compromised.

At 430, the foothold event is analyzed for severity or criticality to the network. At 440, a reconfiguration layer is determined based on the severity of the foothold event. The reconfiguration layer can be based on factors to determine the severity. At 450, the network settings of the network segment are reconfigured according to the reconfiguration layer. Continuing the example, a hacker has been detected and analyzed to find that the hacker has learned the IP addresses and MAC addresses of a server and database having customer account numbers connected to the network segment. The learned data (the IP addresses and MAC addresses) and the criticality of the network data (customer account data is considered extremely sensitive) can factor into a determination of a high reconfiguration layer, for example, a Layer 2 reconfiguration. The Layer 2 reconfiguration can translate to reconfiguring IP addresses, MAC addresses, and other network settings.

At 460, the reconfiguration is deployed to the network. For example, the reconfiguration can change the set of settings of the compromised network segment. Alternatively, a new network segment can be created with the reconfigured settings. The compromised network segment is taken offline and the new network segment replaces the compromised network segment. At 470, the reconfiguration is machine learned to facilitate future reconfigurations. Machine learning concepts are applied to the reconfigurations to help anticipate future reconfigurations. The reconfigurations are stored and analyzed to streamline determining the reconfiguration, the reconfiguration layer, the analysis, and/or the like.

Figure 5:
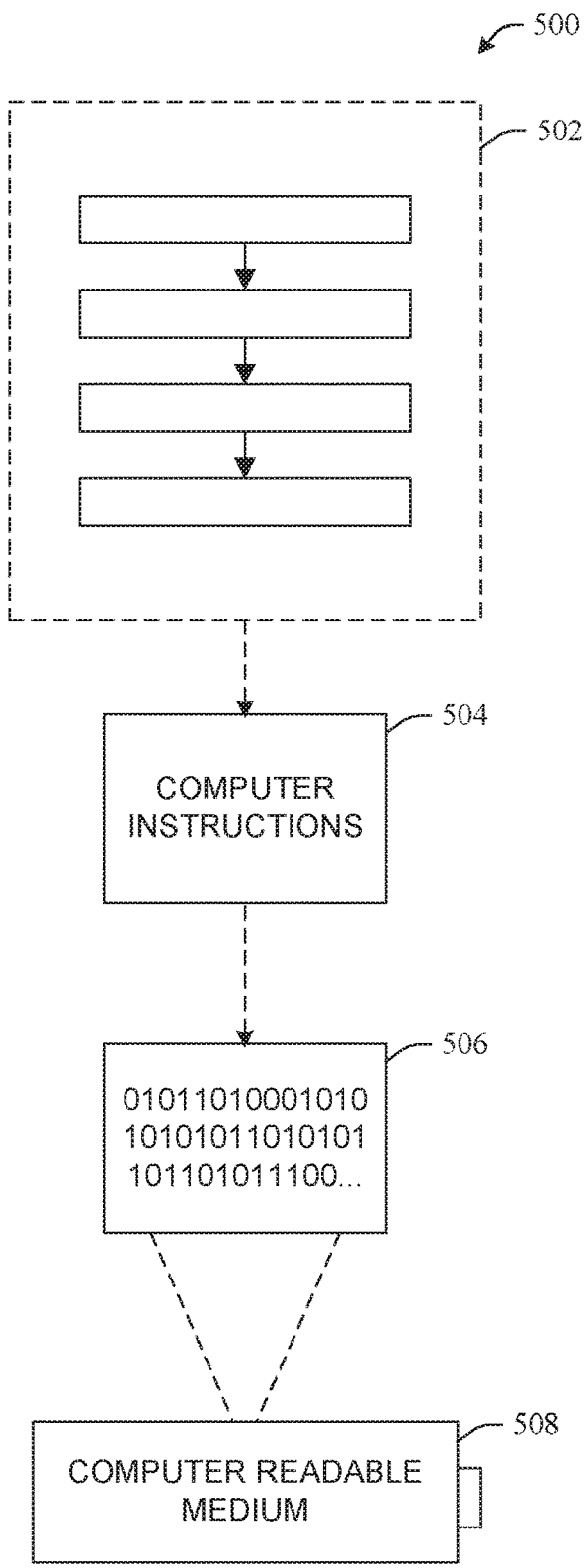
FIG. 5 illustrates a computer-readable medium or computer-readable device comprising processor-executable instructions configured to embody one or more of the provisions set forth herein, according to some embodiments.

Still another embodiment can involve a computer-readable medium comprising processor-executable instructions configured to implement one or more embodiments of the techniques presented herein. An embodiment of a computer-readable medium or a computer-readable device that is devised in these ways is illustrated in FIG. 5, wherein an implementation 500 comprises a computer-readable medium 508, such as a CD-R, DVD-R, flash drive, a platter of a hard disk drive, etc., on which is encoded computer-readable data 506. This computer-readable data 506, such as binary data comprising a plurality of zero's and one's as shown in 506, in turn comprises a set of computer instructions 504 configured to operate according to one or more of the principles set forth herein. In one such embodiment 500, the processor-executable computer instructions 504 is configured to perform a method 502, such as at least a portion of one or more of the methods described in connection with embodiments disclosed herein. In another embodiment, the processor-executable instructions 504 are configured to implement a system, such as at least a portion of one or more of the systems described in connection with embodiments disclosed herein. Many such computer-readable media can be devised by those of ordinary skill in the art that are configured to operate in accordance with the techniques presented herein.

Figure 6:
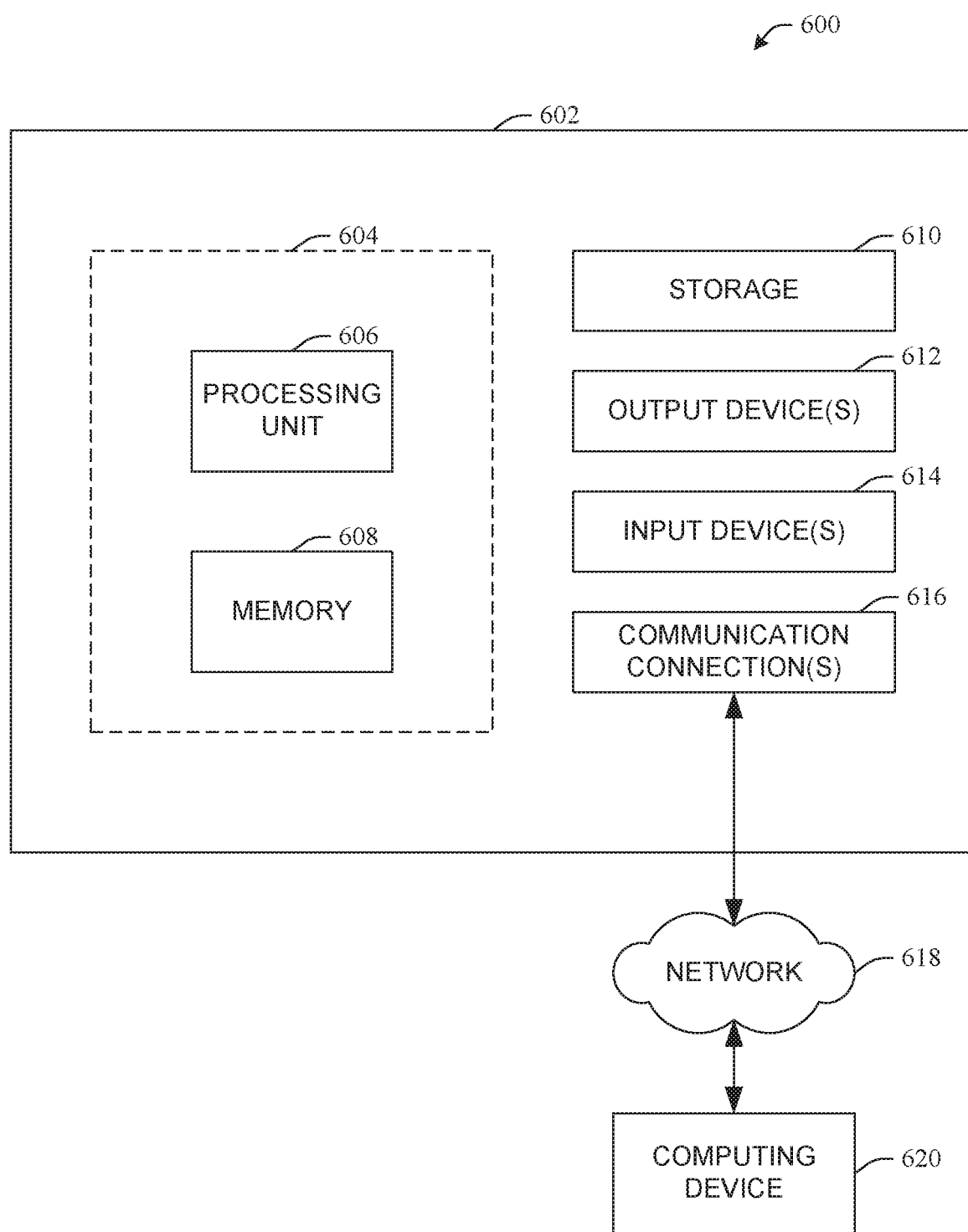
FIG. 6 illustrates a computing environment where one or more of the provisions set forth herein can be implemented, according to some embodiments.

With reference to FIG. 6 and the following discussion provide a description of a suitable computing environment in which embodiments of one or more of the provisions set forth herein can be implemented. The operating environment of FIG. 6 is only one example of a suitable operating environment and is not intended to suggest any limitation as to the scope of use or functionality of the operating environment. Example computing devices include, but are not limited to, personal computers, server computers, hand-held or laptop devices, mobile devices, such as mobile phones, Personal Digital Assistants (PDAs), media players, tablets, and the like, multiprocessor systems, consumer electronics, mini computers, mainframe computers, distributed computing environments that include any of the above systems or devices, and the like.

Generally, embodiments are described in the general context of "computer readable instructions" being executed by one or more computing devices. Computer readable instructions are distributed via computer readable media as will be discussed below. Computer readable instructions can be implemented as program modules, such as functions, objects, Application Programming Interfaces (APIs), data structures, and the like, that perform particular tasks or implement particular abstract data types. Typically, the functionality of the computer readable instructions can be combined or distributed as desired in various environments.

FIG. 6 illustrates a system 600 comprising a computing device 602 configured to implement one or more embodiments provided herein. In one configuration, computing device 602 can include at least one processing unit 606 and memory 608. Depending on the exact configuration and type of computing device, memory 608 may be volatile, such as RAM, non-volatile, such as ROM, flash memory, etc., or some combination of the two. This configuration is illustrated in FIG. 6 by dashed line 604.

In these or other embodiments, device 602 can include additional features or functionality. For example, device 602 can also include additional storage such as removable storage or non-removable storage, including, but not limited to, magnetic storage, optical storage, and the like. Such additional storage is illustrated in FIG. 6 by storage 610. In some embodiments, computer readable instructions to implement one or more embodiments provided herein are in storage 610. Storage 610 can also store other computer readable instructions to implement an operating system, an application program, and the like. Computer readable instructions can be accessed in memory 608 for execution by processing unit 606, for example.

The term "computer readable media" as used herein includes computer storage media. Computer storage media includes volatile and nonvolatile, non-transitory, removable and non-removable media implemented in any method or technology for storage of information such as computer readable instructions or other data. Memory 608 and storage 610 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 602. Any such computer storage media can be part of device 602.

The term "computer readable media" includes communication media. Communication media typically embodies computer readable instructions or other data in a "modulated data signal" such as a carrier wave or other transport mechanism and includes any information delivery media. The term "modulated data signal" includes a signal that has one or more of its characteristics set or changed in such a manner as to encode information in the signal.

Device 602 can include one or more input devices 614 such as keyboard, mouse, pen, voice input device, touch input device, infrared cameras, video input devices, or any other input device. One or more output devices 612 such as one or more displays, speakers, printers, or any other output device can also be included in device 602. The one or more input devices 614 and/or one or more output devices 612 can be connected to device 602 via a wired connection, wireless connection, or any combination thereof. In some embodiments, one or more input devices or output devices from another computing device can be used as input device(s) 614 or output device(s) 612 for computing device 602. Device 602 can also include one or more communication connections 616 that can facilitate communications with one or more other devices 620 by means of a communications network 618, which can be wired, wireless, or any combination thereof, and can include ad hoc networks, intranets, the Internet, or substantially any other communications network that can allow device 602 to communicate with at least one other computing device 620.

What has been described above includes examples of the innovation. It is, of course, not possible to describe every conceivable combination of components or methodologies for purposes of describing the subject innovation, but one of ordinary skill in the art may recognize that many further combinations and permutations of the innovation are possible. Accordingly, the innovation is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method, comprising:
    detecting a foothold event at a first network segment, wherein the first network segment includes a set of network settings;
    analyzing the foothold event upon detecting the foothold event;
    determining a severity score based on the analysis of the foothold event;
    comparing the severity score to two or more score tiers;
    matching the severity score to one score tier of the two or more score tiers based on the comparison;
    determining a reconfiguration layer based on the matched score tier;
    reconfiguring at least part of the set of network settings of the first network segment based on the determined reconfiguration layer; and generating a second network segment having the reconfigured set of network settings that replaces the first network segment.

2. The method of claim 1, wherein the reconfiguration layer determines a subset of network settings of the set of network settings to be reconfigured.

3. The method of claim 1, comprising:
dismantling the first network segment; and
replacing the first network segment with the second network segment.

4. The method of claim 3, comprising:
storing node communication information for the first network segment;
rebuilding communication paths between at least two nodes for the second network segment using the node communication information, wherein the at least two nodes originally communicated with each other via the first network segment.

5. The method of claim 1, wherein the reconfiguring comprises:
receiving a standardized set of network settings from a configuration server.

6. The method of claim 5, wherein the reconfiguring comprises:
machine learning network settings across a network; and
customizing the set of network settings according to machine learned settings on the configuration server.

7. The method of claim 1, wherein the first network segment is a virtual network that is part of the network, the virtual network having a set of virtual network settings.

8. The method of claim 1, wherein the detecting comprises:
monitoring a network for the foothold event, wherein the monitoring is continuous or intermittent.

9. The method of claim 1, wherein the severity score is based on factors, the factors including at least one of criticality of the network segment, overall threat of the foothold event to compromising network data, extent of the foothold.

10. The method of claim 1, wherein the matched score tier affects a subset of network settings in the reconfiguration layer for the second network segment.

11. A system, comprising:
a processor coupled to a memory that includes instructions that when executed by the processor cause the processor to:
detect a foothold event at a first network segment, wherein the first network segment includes a set of network settings;
analyze the foothold event upon detecting the foothold event;
determine a severity score based on the analysis of the foothold event;
compare the severity score to two or more score tiers;
match the severity score to one score tier of the two or more score tiers based on the comparison;
determine a reconfiguration layer based on the matched score tier;
reconfigure at least part of the set of network settings of the first network segment based on the determined reconfiguration layer; and
generate a second network segment having the reconfigured set of network settings that replaces the first network segment.

12. The system of claim 11, wherein the reconfiguration layer determines a subset of network settings of the set of network settings to be reconfigured.

13. The system of claim 11, comprising:
dismantling the first network segment; and
replacing the first network segment with the second network segment.

14. The system of claim 13, comprising:
storing node communication information for the first network segment;
rebuilding communication paths between at least two nodes for the second network segment using the node communication information, wherein the at least two nodes originally communicated with each other via the first network segment.

15. The system of claim 11, wherein the reconfiguring comprises:
receiving a standardized set of network settings from a configuration server.

16. The system of claim 15, wherein the reconfiguring comprises:
machine learning network settings across a network; and
customizing the set of network settings according to machine learned settings on the configuration server.

17. The system of claim 11, wherein the matched score tier affects a subset of network settings in the reconfiguration layer for the second network segment.

18. The system of claim 11, wherein the detecting comprises:
monitoring a network for the foothold event, wherein the monitoring is continuous or intermittent.

19. The system of claim 11, wherein the severity score is based on factors, the factors including at least one of criticality of the network segment, overall threat of the foothold event to compromising network data, extent of the foothold.

20. A non-transitory computer readable medium having instructions to control one or more processors configured to:
detect a foothold event at a first network segment, wherein the first network segment includes a set of network settings;
analyze the foothold event upon detecting the foothold event;
determine a severity score based on the analysis of the foothold event;
compare the severity score to two or more score tiers;
match the severity score to one score tier of the two or more score tiers based on the comparison;
determine a reconfiguration layer based on the matched score tier;
reconfigure at least part of the set of network settings of the first network segment based on the determined reconfiguration layer; and
generate a second network segment having the reconfigured set of network settings that replaces the first network segment.

\* \* \* \* \*